Figure 1:
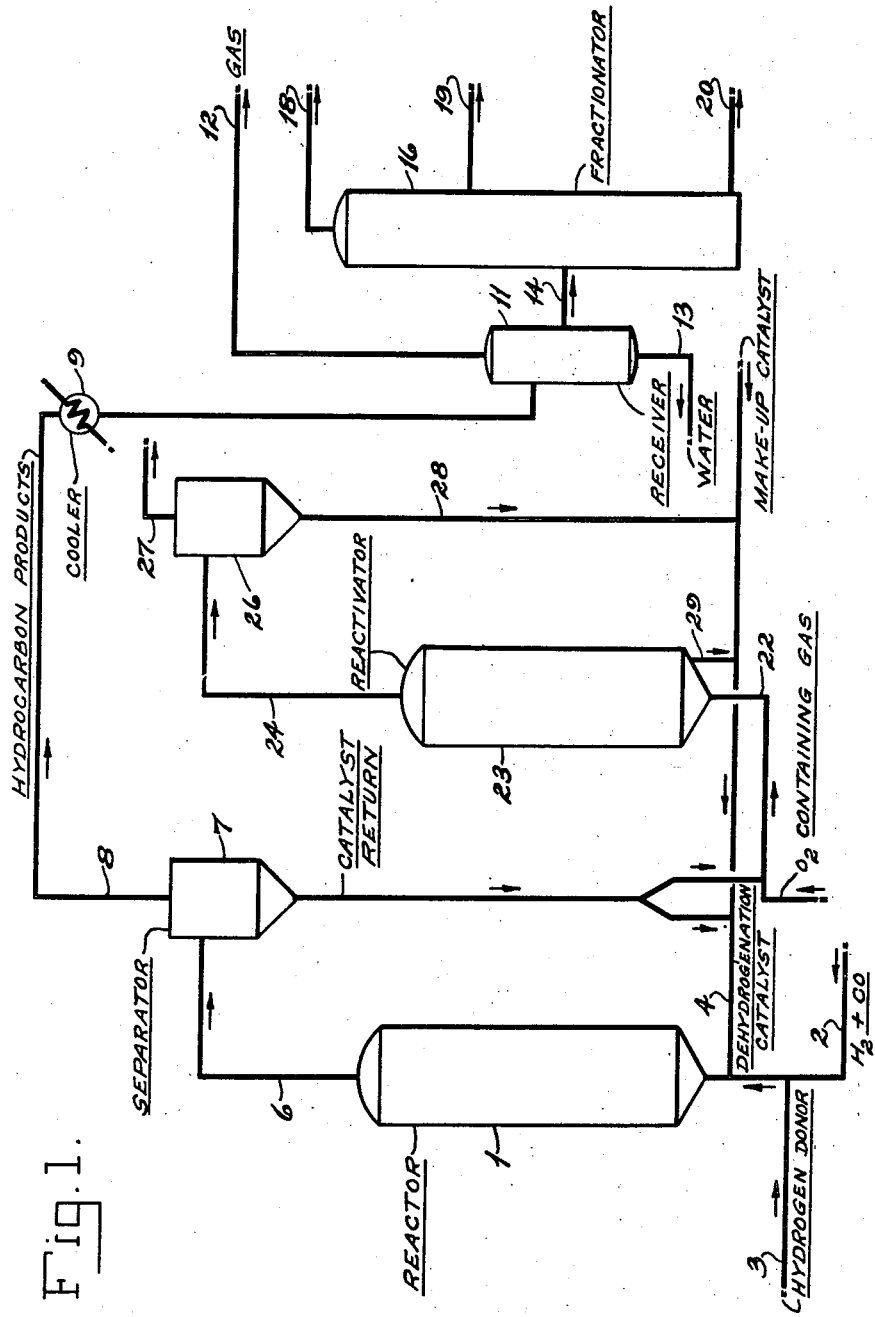

Oct. 25, 1949.      H. V. ATWELL      2,486,243
SIMULTANEOUS DEHYDROGENATION AND HYDROCARBON SYNTHESIS
WITH FLUIDIZED CATALYSTS IN A SINGLE REACTOR
Filed Jan. 6, 1948      2 Sheets-Sheet 1

INVENTOR.
HAROLD V. ATWELL
BY Daniel Stryker
J. H. Grahame
ATTORNEYS

Patented Oct. 25, 1949

2,486,243

UNITED STATES PATENT OFFICE 2,486,243

SIMULTANEOUS DEHYDROGENATION AND HYDROCARBON SYNTHESIS WITH FLUIDIZED CATALYSTS IN A SINGLE REACTOR

Harold V. Atwell, Beacon, N. Y., assignor to The Texas Company, New York, N. Y., a corporation of Delaware Application January 6, 1948, Serial No. 759

8 Claims. (Cl. 260—449.6)

1

This invention relates to a method of effecting catalytic conversions and particularly to a method for effecting two or more reactions substantially simultaneously in a common reaction zone. In one of its more specific aspects, it relates to the production of hydrocarbons from carbon monoxide and hydrogen and the dehydrogenation of a naphthene.

This application is a continuation-in-part of my co-pending application for United States Patent Serial Number 533,901, filed May 3, 1944, now Patent No. 2,443,673.

The invention has application to the conversion of hydrocarbons, and to conversion reactions which involve the production of gasoline and other desired hydrocarbon products. The invention may involve simultaneous treatment of different feed hydrocarbons with separate catalysts, the composite product comprising hydrocarbons useful in the manufacture of motor fuel. The process of this invention is particularly useful for the synthesis of hydrocarbons by the interaction of carbon monoxide and hydrogen.

In accordance with the invention, separate catalytic reactions are carried out simultaneously within a common reaction zone. The synthesis of hydrocarbons from hydrogen and carbon monoxide is an exothermic reaction. In the present invention an endothermic reaction namely dehydrogenation, is carried out simultaneously. It is advantageous to employ a combination of exothermic and endothermic conversions so that heat liberated in the one conversion may be utilized to provide heat for the companion conversion. In the present process the endothermic dehydrogenation of a hydrogen donor, for example a naphthene, serves to utilize at least a portion of the exothermic heat of the hydrocarbon synthesis reaction.

In the reaction of carbon monoxide with hydrogen to produce hydrocarbons, which is highly exothermic, it is important to maintain the reaction temperature within predetermined and narrow temperature ranges. It is, therefore, necessary to remove heat rapidly and effectively from the reaction zone so as to maintain the desired temperature conditions. An advantage of the present invention is that it accomplishes this heat removal, at least in part, by effecting a separate reaction of endothermic character, namely dehydrogenation, in the same reaction zone. A common catalyst may be used, although it is generally advantageous to use different catalysts for the two reactions.

A novel feature of the invention resides in carrying out simultaneously in a common reaction zone a plurality of separate conversions which are capable of producing a composite hydrocarbon product, certain constituents of which are formed from one conversion and certain of which are formed from the companion conversion.

Naphthenes, and particularly those containing the six carbon atom ring, are preferred as the hydrogen donor. Additionally, readily dehydrogenated hydrocarbons produced in the synthesis reaction may be used. The naphthenes may be charged from any suitable source. For example, a straight run naphtha may be charged to the reaction zone as the source of naphthenes. Preferably, however, the naphthene or hydrogen donor is fed in relatively pure form or in admixture with stable diluents to prevent undesirable reactions.

The naphthene hydrocarbons present are converted into aromatics with the liberation of hydrogen as a result of the action of the dehydrogenating catalyst. The hydrogen so liberated is consumed at least in part in the synthesis reaction. Thus the quantity of hydrogen supplied by the hydrogen donor should be taken into account in connection with the determination of the hydrogen in the feed to the process. There is obtained a composite product, the naphtha fraction of which will contain unsaturated aliphatic hydrocarbons and aromatic hydrocarbons in large amounts, and therefore, quite useful in the manufacture of high octane motor fuel having high lead susceptibility.

The employment of two separate catalysts in a common reaction zone may be accomplished by confining a mass of one catalyst within the reaction zone while passing a suspension of the other catalyst in a suitable fluid, either gaseous or liquid, through the confined mass of catalyst, the suspended catalyst being removed with the reaction products, separated therefrom and recycled to the reaction zone. This type of operation is advantageous wherein it is desired to use the moving catalyst suspension as an additional means of removing heat from the reaction zone. In such case the catalyst stream is cooled prior to return to the reaction zone.

Fig. 1 of the accompanying drawing illustrates one method of flow useful in effecting synthesis of hydrocarbons in accordance with the present process.

In a fluidized bed, as used in the process of this invention, the particles of catalyst are fluidized or agitated by the flow of reactants therethrough. The agitation imparts turbulent movement to the catalyst particles, giving a mass of the catalyst the appearance of a boiling liquid. The catalyst is not suspended in the reactants and carried away in the effluent stream to any appreciable extent. A small amount of catalyst is usually carried away as a fine dust due to decrepitation of the catalyst. Particles as large as 200 microns may be present while a small proportion may be less than 10 microns in diameter. Fresh catalyst is added at a rate sufficient to maintain catalyst activity and replenish that lost by mechanical disintegration. A portion or all of the fine catalyst carried away in the effluent stream may be recycled to the reaction zone. If desired, a portion of the synthesis catalyst may be withdrawn from the fluidized bed and subjected to regeneration.

A number of satisfactory synthesis catalysts are known. A suitable catalyst may comprise iron to which may be added a promotor, e. g., oxides of potassium and alumina. Other catalysts, for example, cobalt promoted with thoria and magnesia and supported on a material such as diatomaceous earth or silica gel is sometimes employed.

A finely divided powdered dehydrogenation catalyst is introduced into the reactor through line 4. The average particle size of the dehydrogenation catalyst is less than that of the synthesis catalyst. This permits the effluent gases to carry the dehydrogenation catalyst away from the bed of synthesis catalyst. With the preferred size of synthesis catalyst mentioned hereinabove, the particles of dehydrogenation catalyst should have an average diameter less than 40 microns and may be in the form of an impalpable powder. In a preferred form, however, the powder may be separated by mechanical means without the necessity of resorting to electrical precipitation.

Even though both catalysts are finely divided by ordinary standards, the confined synthesis catalyst is in the form of a mass of relatively coarse particles through which the reactants and relatively fine dehydrogenation catalyst rise at sufficient velocity to maintain the synthesis catalyst in a highly agitated condition, the linear flow being insufficient to carry the synthesis catalyst particles out of the reactor. The residence time of the dehydrogenation catalyst within the reactor can be controlled to some extent by control of the particle size of the catalyst. The dehydrogenation catalyst is thoroughly admixed with the synthesis catalyst in the fluidized fixed bed, but is carried overhead at a rate dependent upon its size and rate of feed of fresh catalyst.

A suitable dehydrogenating catalyst comprises a composite of nickel sulfide and tungsten sulfide. A catalyst comprising finely divided alumina impregnated with a suitable promoter, e. g., an oxide of chromium or molybdenum is also suitable for this purpose.

Preferably the feed stream of hydrogen and carbon monoxide and the hydrogen donor, in this instance methyl cyclohexane, are preheated to approximately the reaction temperature before injection into the reactor.

The carbon monoxide and hydrogen feed rise through the fluidized fixed bed of synthesis catalyst and react exothermically to produce gasoline hydrocarbons. The methyl-cyclohexane is dehydrogenated by the action of the finely divided dehydrogenation catalyst suspended in the reactants. At the same time any naphthene hydrocarbons produced in the synthesis reaction are dehydrogenated. The hydrocarbon products are removed from the top of the reactor through a conduit 6 leading to a separator 7 to which reference will be made later. From the top of the separator 7 the hydrocarbons, including dehydrogenated naphthenes and unreacted carbon monoxide and hydrogen, are conducted through a pipe 8 and condenser 9 to a gas separator 11. Gaseous constituents are discharged from the separator 11 through a pipe 12. Water and dissolved oxygenated hydrocarbons, e. g., alcohols, are withdrawn through pipe 13. Gas containing unreacted hydrogen and carbon monoxide may be recycled to the reactor. The hydrocarbons are drawn off from the separator through a pipe 14 leading to a fractionator 16 wherein they are fractionated into as many fractions of desired boiling range as may be desired. A light distillate fraction, for example, is removed through a pipe 18 while an intermediate fraction containing naphthenes for recycle is removed through pipe 19, and a residual fraction is removed through a pipe 20.

The reaction products flowing through the previously mentioned conduit 6 comprise products of the synthesis reaction as well as products of the dehydrogenating reaction, and in addition, catalyst powder suspended therein. These products are discharged into separator 7 for the purpose of effecting separation of the suspended catalyst from the hydrocarbons. The separator 7 may be of either centrifugal or electrical type or may comprise a combination of both.

Separated catalyst is continuously returned to the reactor trough pipe 4. A part or all of the catalyst may be reactivated before return to the reactor. This is accomplished by passing catalyst through a conduit 22 leading to the bottom of the reactivator 23 wherein carbonaceous material deposited on the catalyst is removed therefrom by burning with an oxygen-containing gas. The reactivating gas is introduced from a source not shown into a pipe 22 and is used to carry the catalyst powder into and upwardly through the reactivator 23. The products of combustion and the reactivated catalyst are discharged through a conduit 24 into a dust separating unit 26. The gaseous products of combustion are discharged from the separator 26 through a pipe 27.

The reactivated catalyst is drawn off through a conduit 28, which communicates with the previously mentioned conduit 4, by which means the reactivated catalyst is recycled through the reaction zone. Reactivated catalyst may also be withdrawn from the reactivator through pipe 29 for recycle to the reactor. If desired, the catalyst may be subjected to reduction with hydrogen before recycle to the reactor, by any suitable means, not disclosed in the reactor. Fresh catalyst for makeup or in lieu of regenerated catalyst may be supplied as needed.

Figure 2:
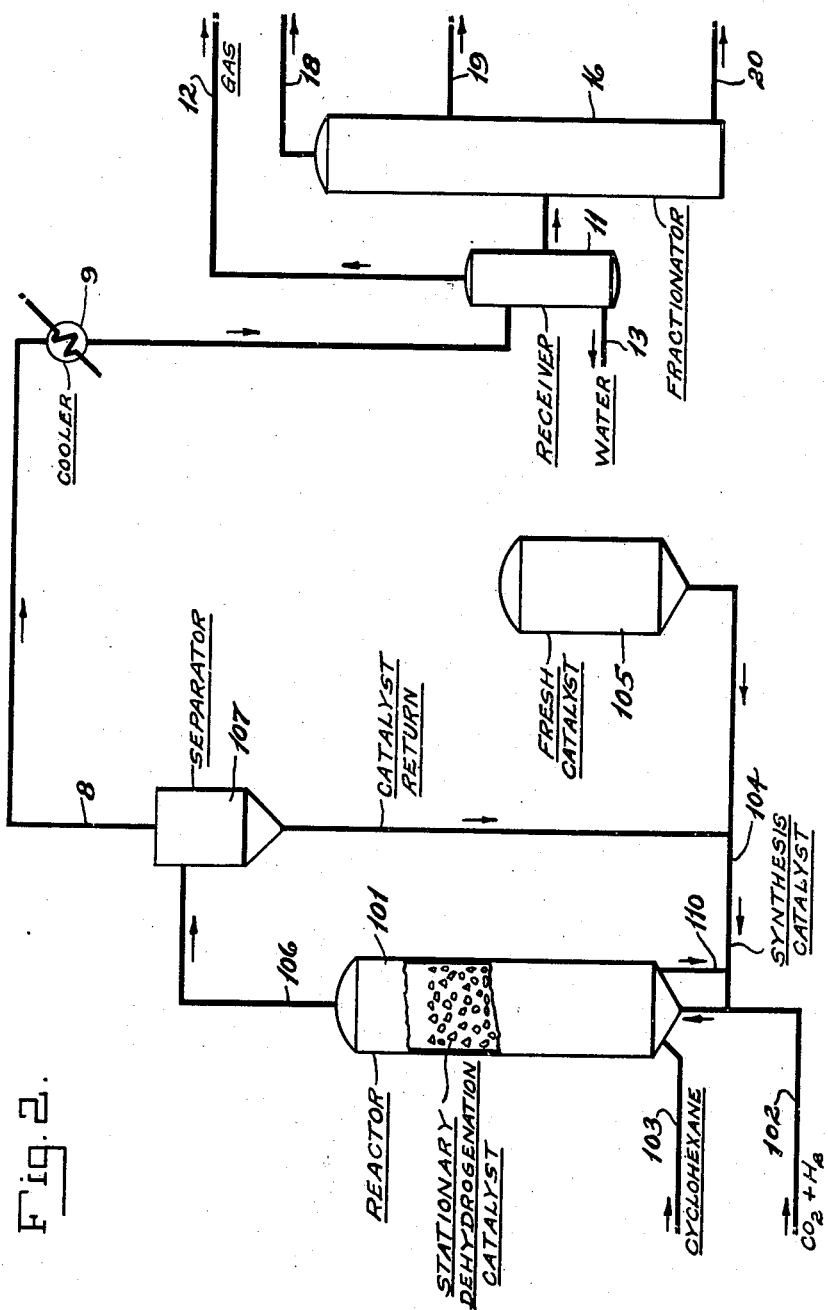

Fig. 2 illustrates one alternative method of flow for carrying out simultaneously the reaction of carbon monoxide and hydrogen to produce synthetic hydrocarbons and the dehydrogenation of a naphthene.

In the modification of Fig. 2 the dehydrogenation catalyst is stationary in a fixed bed while the synthesis catalyst is circulated.

The vessel 101 contains a fixed bed of dehydrogenating catalyst which may be in the form of granules, pellets, blocks, rings, or cylinders. If the catalyst is in the form of granules or particles, such granules or particles should be relatively coarse, for example, ranging in diameter from ¼ to ½ inch, so as to facilitate passage of gaseous fluids laden with powdered synthesis catalyst through the fixed beds.

Carbon monoxide and hydrogen are fed into the reactor through conduit 102. A naphthene, suitably cyclohexane, as hydrogen donor is introduced through line 103.

The hydrogen donor, in this specific example, cyclohexane, may be introduced with the carbon monoxide and hydrogen feed or introduced separately near the bottom of the reactor a short distance above the point of introduction of the carbon monoxide and hydrogen. When carbon monoxide and hydrogen are initially introduced into the reactor a relatively large amount of heat is liberated with attendant elevation of temperature at this point above the average temperature in the catalyst bed. Introduction of cyclohexane at the point of local overheating results in favorable reaction conditions for dehydrogenation of cyclohexane and rapid utilization of heat released by the synthesis reaction.

Synthesis catalyst in finely divided form is introduced into the reactor through conduit 104. The catalyst may be introduced by suspension into the stream of reactants or may be introduced into the reactor in any other convenient manner. It may, for example, be introduced with the cyclohexane or directly to the bed of stationary dehydrogenation catalyst by suitable means not illustrated in the drawing.

Fresh catalyst is supplied from a storage bin 105 to replace catalyst lost by carryover or whenever it is desirable to add fresh catalyst to the system.

The synthesis catalyst in finely divided form is fluidized by the flow of the gaseous reactants and reaction products therethrough. The degree of fluidization depends upon the rate of flow of reactants and the size of the synthesis catalyst particles. With a particle size of less than about 40 microns the synthesis catalyst is generally entrained and carried to the top of the stationary dehydrogenation catalyst from which it may be recycled by carryover in the effluent through line 106 to separator 107 where, after separation from the gaseous effluent, it is returned to line 104. Catalyst may be recycled internally by any suitable means not illustrated in the drawing as will be evident to those skilled in the art. Additionally, the synthesis catalyst may be removed via conduit 110 from the lower portion of the reactor and returned through conduit 104.

Generally it is desirable to operate the modification of Fig. 2 under conditions of catalyst particle size and flow rates such that the synthesis catalyst is fluidized to the extent that it is violently agitated within the reaction zone but with the carryover limited to the finer portions of the catalyst particles.

The separator 107 may be mechanical or electrical or a combination of both types and is preferably provided with means, not illustrated, for discharge of the very fine particles of catalyst from the system.

Gaseous effluent leaves separator 107 through pipe 8 for further separation as described in connection with Fig. 1 wherein the same numerals are used to designate like elements.

Reference has been made to employing upflow of reactants in reactor 101. However, it will be understood that downflow of reactants and finely divided catalyst may be employed.

The usual provisions may be made for recycling catalyst, reactants and the like as is known in the art. Similarly, the catalyst may be revivified by any of the well known means, although not illustrated in this figure of the drawing.

The confined catalyst of Fig. 2 can be subjected to periodic reactivation, and therefore, it is advantageous to employ a plurality of reactors so that the charge can be switched from one to the other when it is desired to effect reactivation of the confined or fixed bed catalyst.

The two different catalysts employed for the foregoing reactions may be separated from one another, if desired, prior to regeneration of either. Mechanical means taking advantages of difference in physical properties of the catalyst will generally be employed. For example, the difference in particle size offers one means of separating the catalyst. When iron is used as the synthesis catalyst it may be separated magnetically from the dehydrogenation catalyst.

While certain specific catalysts have been mentioned, it will be understood that these are mentioned merely by way of example and that other known catalysts for cracking, dehydrogenation, isomerization, etc., may be employed.

While any of the hydrocarbons which may be more readily dehydrogenated may be satisfactorily employed as hydrogen donors, the naphthenes containing six carbon atom rings are the most suited to the requirements of the process. Suitable naphthenes include cyclohexane, methylcyclohexane, dimethylcyclohexanes, ethylcyclohexane, propylcyclohexanes and the like. While other naphthenes may be dehydrogenated, they are not as desirable as the foregoing, which may be dehydrogenated to aromatics. Naphthenes containing a five carbon atom ring, for example, are not as desirable, since they tend to decompose to carbon.

Obviously many modifications and variations of the invention as above set forth may be made without departing from the spirit and scope thereof, and therefore only such limitations should be imposed as are indicated in the appended claims.

I claim:

1. A process for the production of liquid hydrocarbons by the reaction of hydrogen with carbon monoxide which comprises passing a mixture of carbon monoxide and hydrogen into contact with a hydrocarbon synthesis catalyst in a reaction zone under reaction conditions effective for synthesis of liquid hydrocarbons, simultaneously passing to the reaction zone a naphthenic hydrocarbon in vapor form into contact with a separate catalyst effective for dehydrogenation of said hydrocarbon, maintaining reaction conditions such that both of said reactions are effected to a substantial extent, maintaining the separate catalysts in fluidized condition within the reaction zone under conditions such that one of the catalysts is selectively entrained in the resulting gaseous reaction products, withdrawing said reaction products containing entrained catalyst from the reaction zone, and supplying additional amounts of said catalyst to the reaction zone.

2. A process as defined in claim 1 wherein the naphthenic hydrocarbon is a naphthene containing a six carbon atom ring.

3. A process as defined in claim 1 wherein the synthesis catalyst comprises finely divided iron in a fluidized fixed bed and the dehydrogenation catalyst is selectively entrained in the gaseous reaction products.

4. A process as defined in claim 3 wherein at least a portion of the dehydrogenation catalyst withdrawn from the reaction zone with the reaction products is subjected to regeneration with an oxygen-containing gas and returned to the reaction zone.

5. In a process for the conversion of carbon monoxide and hydrogen to liquid hydrocarbons, the improvement which comprises passing said carbon monoxide and hydrogen in admixture with a naphthenic hydrocarbon in vapor form as a hydrogen donor into contact with separate solid catalysts in a reaction zone under reaction conditions effective for the conversion of carbon monoxide and hydrogen to liquid hydrocarbons, one of said catalysts being effective for the synthesis of hydrocarbons while the other of said catalysts is effective for the dehydrogenation of naphthenic hydrocarbons, maintaining one of said catalysts in the reaction zone in a substantially fixed bed of relatively large particles and maintaining the other catalyst in finely divided form interspersed among and in contact with said particles in said fixed bed of catalyst, continuously withdrawing a portion of the finely divided catalyst from the reaction zone and continuously supplying an equivalent amount of said finely divided catalyst to said zone.

6. A process as defined in claim 5 wherein the catalyst withdrawn from the reactor is withdrawn by entrainment in the reaction products.

7. A process as defined in claim 5 wherein the dehydrogenation catalyst is supplied to the reactor in the form of a fine powder suspended in the reactant gas and withdrawn therefrom as a suspension in the reaction effluent and the synthesis catalyst is an iron hydrocarbon synthesis catalyst in the form of coarser particles maintained in a highly agitated condition without substantial entrainment from the reaction zone.

8. A continuous process for effecting catalytic conversion of gaseous reactants including carbon monoxide and hydrogen by contact with a finely divided solid synthesis catalyst within a reaction zone maintained under conversion conditions effective for the synthesis of liquid hydrocarbons, which comprises disposing within a vertical reaction zone a fixed bed of solid dehydrogenation catalyst in relatively coarse particle form, said bed of dehydrogenation catalyst being catalytically active for the dehydrogenation of naphthenic hydrocarbons; continuously introducing to the lower portion of said reaction zone a gaseous reactant stream containing carbon monoxide, hydrogen, and a naphthenic hydrocarbon containing a six carbon atom ring; introducing into the gaseous stream finely divided particles of solid sythesis catalyst which are entrained in said stream, passing said stream containing suspended synthesis catalyst upward through said bed of dehydrogenation catalyst effecting substantial conversion of carbon monoxide and hydrogen into liquid hydrocarbons and dehydrogenation of said naphthenic hydrocarbon, and continuously removing from the upper portion of said reaction zone an effluent stream of reaction products containing the synthesis catalyst suspended in the aforesaid gaseous reactant stream.

HAROLD V. ATWELL.

REFERENCES CITED

The following references are of record in the file of this patent:

UNITED STATES PATENTS

| Number | Name | Date |
|---|---|---|
| 2,284,468 | Burk et al. | May 26, 1942 |
| 2,393,909 | Johnson | Jan. 29, 1946 |

FOREIGN PATENTS

| Number | Country | Date |
|---|---|---|
| 423,001 | Great Britain | Jan. 23, 1935 |